United States Patent
Schwerdtfeger et al.

(10) Patent No.: US 6,748,391 B1
(45) Date of Patent: Jun. 8, 2004

(54) ALTERNATE ACCESS THROUGH A STORED DATABASE MODEL OF A COMPUTER CONTROLLED INTERACTIVE DISPLAY INTERFACE TO INFORMATION INACCESSIBLE DIRECTLY THROUGH THE INTERACTIVE DISPLAY INTERFACE

(75) Inventors: Richard Scott Schwerdtfeger, Round Rock, TX (US); James Winthrop Thatcher, Austin, TX (US); Lawrence Frank Weiss, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 09/121,747

(22) Filed: Jul. 21, 1998

(51) Int. Cl.⁷ .............................................. G06F 17/00
(52) U.S. Cl. ..................... 707/102; 707/10; 707/101; 345/738; 345/744; 345/747
(58) Field of Search ................. 707/4, 10, 3, 102, 707/101, 529, 530, 526; 345/335, 339, 157, 700, 738, 744, 747; 717/2, 4, 3; 715/500, 506, 513

(56) References Cited

U.S. PATENT DOCUMENTS

| | | | | |
|---|---|---|---|---|
| 4,481,603 A | * | 11/1984 | McCaskill et al. .......... 364/900 |
| 4,899,276 A | | 2/1990 | Stadler ....................... 364/300 |
| 5,377,319 A | * | 12/1994 | Kitahara et al. ............ 395/161 |
| 5,447,164 A | * | 9/1995 | Shaya et al. ................ 128/710 |
| 5,880,724 A | * | 3/1999 | Bertran et al. .............. 345/339 |
| 5,883,640 A | * | 3/1999 | Hsieh et al. ................. 645/503 |
| 5,884,056 A | * | 3/1999 | Steele ......................... 395/339 |
| 5,982,365 A | * | 11/1999 | Garcia et al. ............... 345/336 |
| 6,023,697 A | * | 2/2000 | Bates et al. .................... 707/4 |
| 6,069,627 A | * | 5/2000 | Conrad et al. .............. 345/347 |

* cited by examiner

Primary Examiner—Charles Rones
Assistant Examiner—Jacques Veillard
(74) Attorney, Agent, or Firm—Jeffrey B. Kraft; Jeffrey S. LaBaw

(57) ABSTRACT

A computer controlled display interface system is provided for accessing information interactively inaccessible through said display interface comprising means for storing a database model of the dynamic data content of said display interface, means for connecting said display interface to said stored database model, means in said database model for sensing predetermined displayed data content in said interface, and means responsive to said sensing means for providing said information to said interface. The information provided may come from a help library or from a database accessed through an Internet or World Wide Web Browser.

44 Claims, 4 Drawing Sheets

ALTERNATE ACCESS THROUGH A STORED DATABASE MODEL OF A COMPUTER CONTROLLED INTERACTIVE DISPLAY INTERFACE TO INFORMATION INACCESSIBLE DIRECTLY THROUGH THE INTERACTIVE DISPLAY INTERFACE

TECHNICAL FIELD

The present invention relates to user interactive computer supported display technology and particularly to user interactive display interfaces which are user friendly; more particularly, the invention is directed to tools which may be used in the design and development of such interfaces.

BACKGROUND OF THE INVENTION

The 1990's decade has been marked by a technological revolution driven by the convergence of the data processing industry with the consumer electronics industry. This advance has been even further accelerated by the extensive consumer and business involvement in the internet over the past few years. As a result of these changes, it seems as if virtually all business and technology in the industrialized world requires human-computer interfaces.

It has been recognized for over a decade that the interfaces to all aspects of computer driven and directed technology are the key to the future of the technology. Consequently, extensive resources have applied to the constant improvement of the human-computer interfaces, i.e. making such interfaces more user-friendly, more intuitive and easier to learn and remember. This has resulted in greatly increasing the numbers of developers and programmers working on improving interactive display interfaces. Also, with the ever increasing interest in computer games and, more recently, the Internet explosion, greater numbers of developers are directing their resources toward the development of interactive display interfaces in those two consumer areas.

In the understanding of the needs that gave rise to the present invention it is important to note that the developers of interfaces to a variety of programs rarely use the programs themselves to support the interactive display tools which they are using to develop or modify such programs. Rather, the developers use emulations of the program interfaces provided by graphics functions of the operating system of the computer display being used for the development together with the development application. Since the interfaces being worked on by the developers have substantially no connection to the programs for which interfaces are being developed, the developer cannot access the program through his display interface and, thus, has no direct way of getting additional information about the program should he need it. For example, the developer is working on a display interface to a mainframe computer which is an emulation of an IBM 3270 I/O terminal or writing a particular computer input program and finds that he needs help to understand a term or other aspect of the program on which he is working, he cannot access the program itself through his development display interface. He has to leave his development function and actively bring up the program for which the interface is being developed so that he may launch a help system within the program. This may be disruptive and awkward but doable where the developer has substantial computer experience. However, in the case of interface developers, they are often involved because of their design rather than computer skills and finding suitable help by launching the actual program could cause them considerable delay.

SUMMARY OF THE INVENTION

The present invention provides alternate access to such program help and other information not directly accessible through the interface by providing access via a stored database model of the actual program interface which is being developed or emulated. Accordingly, the present invention provides in a display interface, provided by the combination of an operating system and at least one application program, the combination of means for dynamically storing a database model of the data content of a display interface to said application program (i.e. as the display screen changes through a sequence of screen, the database is continually updated to reflect such changes), means in said database model for sensing the displayed data content in said interface, and means responsive to said sensing means for providing additional displayed information to said interface. In a preferred embodiment, this sensed displayed data content is text, and preferably is responsive to a user input indicating a need for help relative to displayed text. The user input usually designates the displayed text for which help is needed, e.g. by using the cursor or keystroke to highlight the text indicative of the help needed. In response to such an indication of help needed, e.g. the user highlighting the stored database model has means for interpreting the text highlighted by the cursor and accessing appropriate help in the help system.

According to other aspects of the present invention, the development program may be a text editor for writing programming commands or it may be a program for the emulation of an interface to a mainframe computer. Also, the displayed interface may be a page obtained off the World Wide Web or Internet through a browser program and the database model may function to store a model of such page and interpret data on said page to launch the browser program to activate selected predetermined links to network databases.

In its broadest aspects, the present invention is directed to an interactive display interface having a subsystem for accessing information interactively, inaccessible through said display interface, comprising means for storing a database model of the dynamic data content of said display interface, means in said database model for sensing predetermined displayed data content in said interface and means responsive to said sensing means for providing said information to said interface.

DETAILED DESCRIPTION OF THE PREFERRED EMBODIMENT

Figure 1:
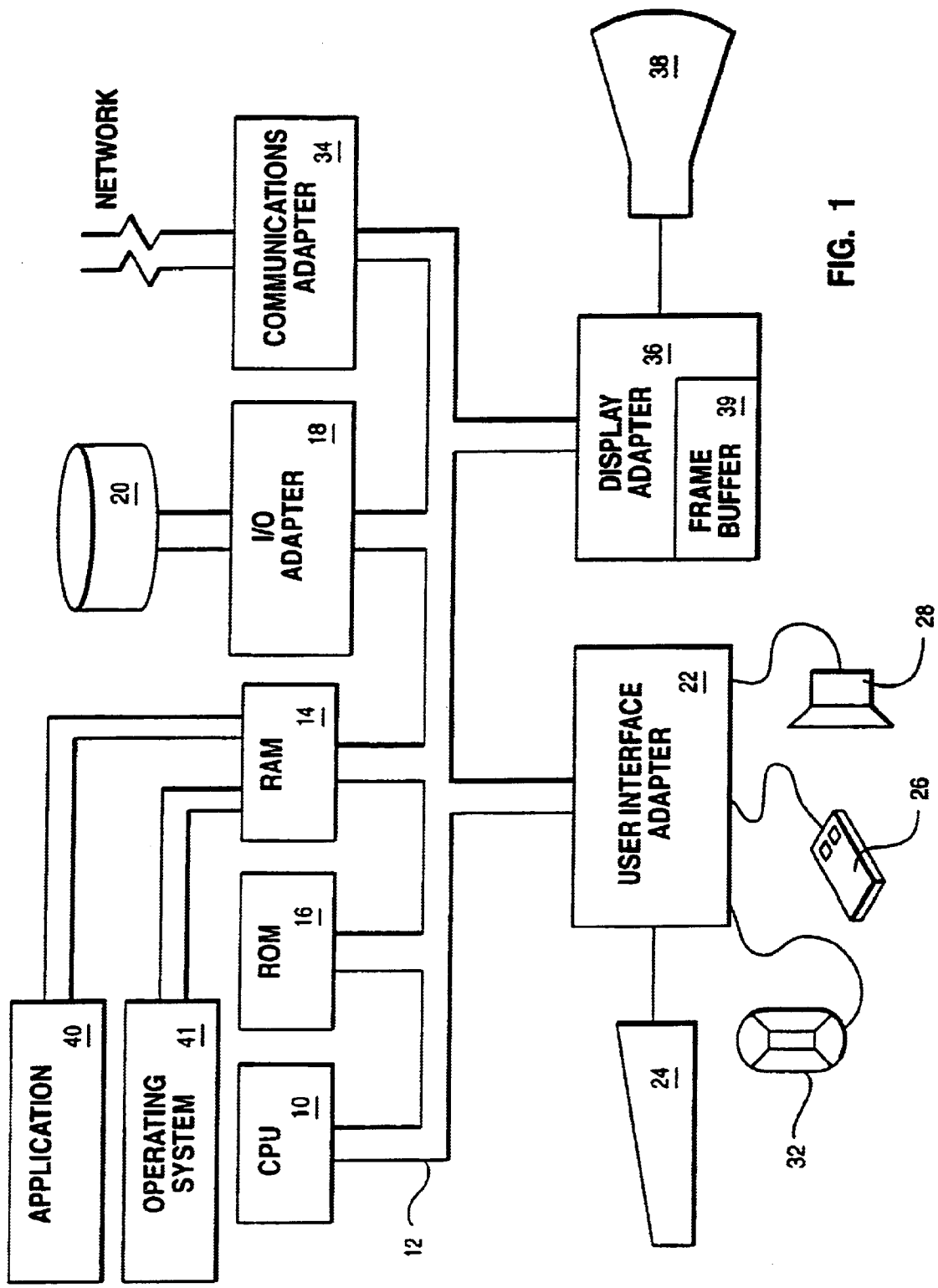
FIG. 1 is a block diagram of a data processing system including a central processing unit which is capable of implementing the present invention.

Referring to FIG. 1, a typical data processing system is shown which may function as the computer controlled display system used for supporting the system of the present invention which uses the stored database model of the dynamic data content of the display screen for the alternate access of information which is not directly accessible through the screen interface. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be any commercially available system, such as the OS/2 operating system available from International Business Machines Corporation (OS/2 is a trademark of International Business Machines Corporation); Microsoft's Windows 95™ or Windows NT™, as well as Unix and AIX operating systems. A programming application illustrated as application 40, to be subsequently described in detail, runs in conjunction with operating system 41 and provides output calls to the operating system 41 to perform a variety of interactive user interface operations such as designing user interfaces for other programs. For example, the operation may be designing an interface to a mainframe computer which is an emulation of an IBM 3270 I/O terminal or writing a particular computer input program.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14, which is the computer system's main memory. As will be described subsequently in greater detail, there is stored in RAM 14, the database model of the dynamic data content of the display interface to application 40. I/O adapter 18 may be a small computer system adapter that communicates with the disk storage device 20, i.e. a hard drive. communications adapter 34 interconnects bus 12 with an outside network enabling the data processing system to communicate with other such systems, particularly when the operations controlled by the interfaces of the present invention are in a network environment or when the controlled operations are in communication systems. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39, which is a storage device that holds a representation of each pixel on the display screen 38. Images may be stored in frame buffer 39 for display on monitor 38 through various components such as a digital-to-analog converter (not shown) and the like. By using the aforementioned I/O devices, a user is capable of inputting information to the system through the keyboard 24, trackball 32 or mouse 26 and receiving output information from the system via speaker 28 and display 38.

Figure 2:
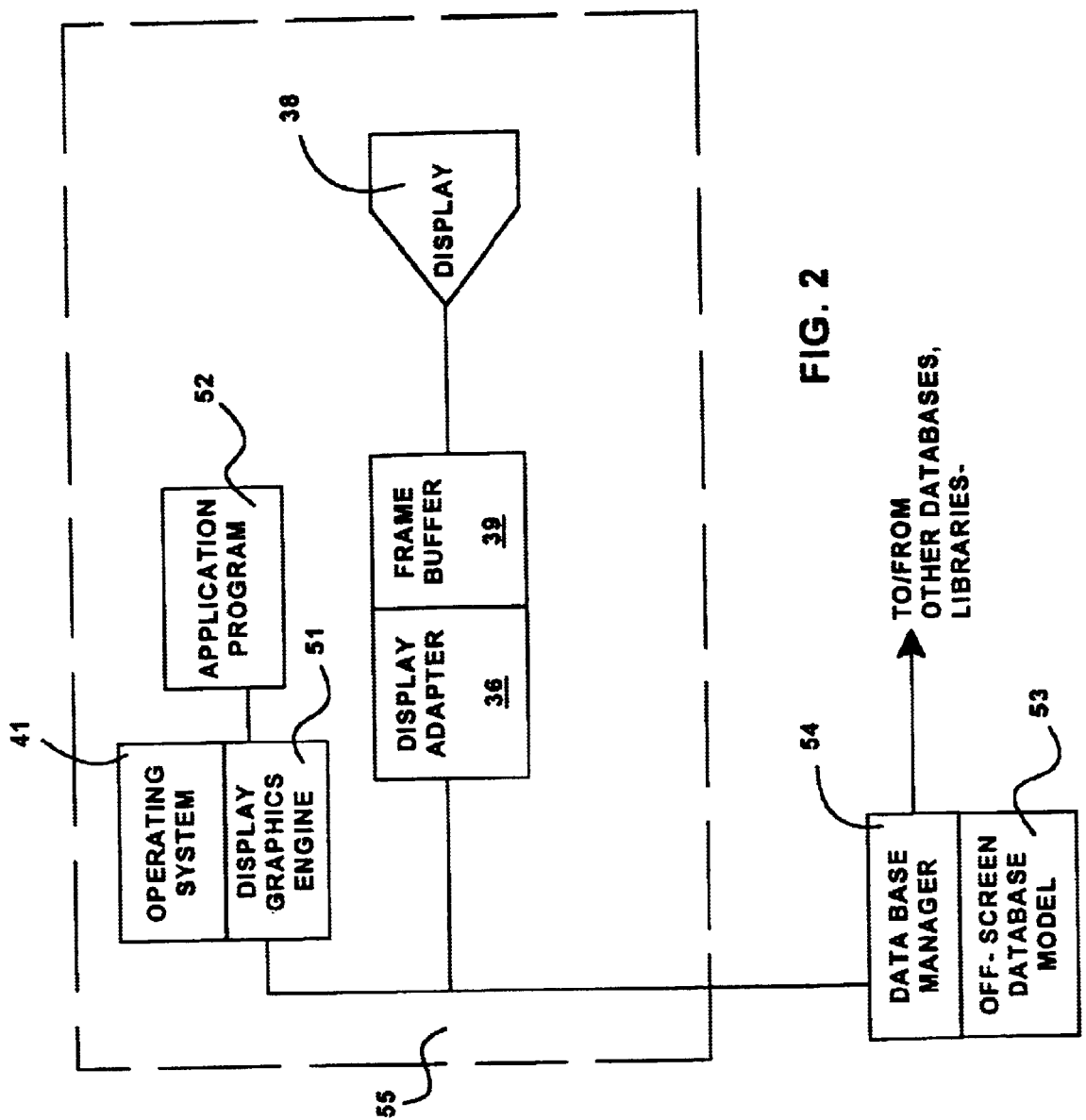
FIG. 2 is a block diagram showing the layout of the off-screen database model as used in the present invention with respect to the data processing system of FIG. 1.

At this point with reference to FIG. 2, we will first describe the fundamentals involved in the present invention. FIG. 2 shows how the off-screen database model used in this invention is associated with the data processing system of FIG. 1 in the implementation of the invention. It is important to note that the present invention is applicable to situations where the user of an interactive display interface wishes to access data or databases which are not associated with the particular application or applications active on the display screen. As set forth hereinabove, this situation is very common when interfaces to applications or systems are being developed or programs are being written or developed. Developers of interfaces or program writers do not use the programs themselves to support the interactive display tools which they are using to develop or modify such programs. Rather, the developers use emulations of the program interfaces provided by graphics functions of the operating systems of computer displays being used for the development together with the development applications. Since the interfaces being worked on by the developers have substantially no connection to the programs for which interfaces are being developed, the developer cannot access the program through his display interface and, thus, has no direct way of getting additional information about the program should he need it. For example, the developer is working on a display interface to a mainframe computer which is an emulation of an IBM 3270 I/O terminal or writing a particular computer input program and finds that he needs help to understand a term or other aspect of the program on which he is working, he cannot access the program itself through his development display interface. As set forth hereinabove, the present invention provides the interactive user with an alternate route to access such normally inaccessible information via a stored off-screen database model which is a dynamic model of the dynamic data content of the display interface. The term dynamic "data content" is used to distinguish it over the dynamic "pixel array content" which is the actual pixel array on the display screen as determined by the frame buffer content. The dynamic data content as tracked by the off-screen database model of the screen is a model of the actual text, graphics, icon or other symbol content of the display which, as such, may be monitored or sensed for particular text or icon content. This dynamic data content is tracked and updated in the database model screen by screen as the display interface is modified.

In the system shown in FIG. 2, the application program 52 represents, for example, a program which an interface developer is using to develop a display interface to, let us say, a word processing program. The development application program 52 user's interactive interface requirements are provided by the graphics engine 51 of operating system 41, e.g. the graphics/text functions of Windows95™ which in turn provides the screen by screen dynamic pixel array layouts needed for the interactive developer/user layouts. These pixel arrays are provided through display adapter 36 to frame buffer 39 which maintains the user interactive pixel array panels on display 38. Now, if in the development of a program or display interface the developer has the need to find out the syntax of a particular programming term in the program which he is developing or help with the applicability of a function in a word processing application program under development, he normally cannot obtain this through the interface provided by the system described thus far since he is not connected to the particular application program for which he is doing the developing. This is the status of the system of the prior art which is the system 55 within the boundaries of the dashed line in FIG. 2. Even if in using system 55 one wished to establish some displayed on-screen text or icons which could launch a routine to access the desired information, there would be no means available within system 55 to interpret such text or icons since the existing support for the screen sequences on display 38 only track the pixel content rather than the data content which would be necessary for any such interpretation.

It is the off-screen database model 53 controlled by database manager 54 of the present invention which provides the screen content interpretive function and the means for launching means for linking to the appropriate databases or libraries from which the needed additional information could be obtained.

An early description of the off-screen database model used in the combination of the present invention may be found in an article by Richard S. Schwerdtfeger, one of the inventors of the present invention, in *Byte Magazine*, December 1991, entitled "Making the GUI Talk", pp. 118–126, which details the off-screen database. This off-screen database is a dynamic reconstruction of what is visible on a display interface at any point in time. In accordance with the technology described, this off-screen database is used to convert the graphics and text in the display interface into a voice synthesized verbal description of what is visible on the screen. We have found that this off-screen model may be used to track the dynamic data content of what is on the screen at any time so that the data content may be interpreted and used to link the system to other data sources and stored libraries to provide additional or ancillary information required by our system. The off-screen model database or OSM is a database reconstruction of what is visible on the screen and also what is not visible on the screen. A database must manage information resources, provide utilities for managing these resources and supply utilities to access the database. The resources the OSM must manage are text, off-screen bit maps, icons and cursors.

Text is obviously the largest resource the OSM must maintain. It is arranged in the database relative to its position on the display or to the bit map on which it is drawn. This situation gives the model an appearance like that of the conventional display buffer. Each character must have certain information associated with it: foreground and background color; font family and typeface name; point size; and font style, such as bold, italics, strike-out, underscore and width.

Merging text by baseline (i.e. position on the display) gives the model a physical display buffer appearance. To merge associated text in the database, the model combines text in such a way that characters in a particular window have the same baseline. Each string of text in the OSM has an associated bounding rectangle used for model placement, a window handle and a handle to indicate whether the text is associated with a particular bit map or the display.

The operation required to transfer bit maps is called a BitBlt or bit block transfer. GUIs use BitBlts for speed. For example, in a drop-down menu it is much faster to transfer the pixels cut from the screen back onto the screen than to have the application redraw or "paint" that portion of the screen from scratch.

In windowing systems, more than one application can be displayed on the screen. However, your keyboard input is directed to only one active window at a time. But each active window is often made up of many child windows. The applications cursor is placed in at least one of these child windows. The OSM must keep track of a cursor's window identifications. An example of a cursor is the blinking insertion bar in an editor or the rectangular highlighting text in a menu of options.

The OSM must keep track of the cursor's screen position, dimensions, the associated text string (i.e. speakable cursor text) and string character position. If the cursor is a blinking insertion bar, its character position is that of the associated character in the OSM string. In this case, the cursor's text is the entire string.

A wide rectangular cursor is called a selector, since it is used to isolate screen text to identify an action. Examples of selector cursors are those used for spreadsheets or drop-down menus. The text that is enclosed within the borders of the selector is the text that the screen reader would speak in voice synthesized applications.

It should be noted that the programs used to do the display reconstruction or off-screen database model are the same low level interface graphics engines or functions of the operating system which is used to form the display interfaces used by the program or interface developers. The point is, that in the off-screen database model the operations being performed on the text or database content representations of the bit maps, cursors or icons, as opposed to the actual bit maps of these elements, as in the actual display interface. Thus, the model stores the dynamic data content of the display interfaces rather than the bit maps themselves.

The utilities required to handle text are clipping, erasure, text merger and text transfer. These tools must handle icons as well as text. Developers do not normally worry about clipping text to the windows in their GUI applications. Text running outside the window must be clipped off by the low-level graphics routines and the code constructing the model must also perform the same operation. Therefore, the model must provide tools to clip the text to the clip region supplied by the software constructing the model. This region is represented by an array of rectangles defining the visible domain.

You can use text-erasing tools when placing one window over another or when you reduce the size of a window. You can use text-merger tools when you combine text with other text having the same handle and screen baseline. Simply put, text is merged into an OSM bit map representation using common baselines.

Performing a BitBlt requires tools to transfer functions for text and cursors. For example, if you are moving a window from one part of the display to another, or when text that was previously drawn to a memory bit map is transferred to the screen. Therefore, tools are also required for moving text between the visible display portion of the database and the nonvisible off-screen portion where OSM representations of bit maps are stored.

As set forth in the referenced Byte Magazine article, in the off-screen database model construction, the construction code, called the patch code, is operating system dependent because specific patch code function calls are patched or hooked in with a subset of the low-level graphics calls. The calls to hook are those that draw text; perform BitBlts; save bit maps to display card memory; restore bit maps from display card memory; select and unselect bit maps for drawing; delete bit maps; map display buffers to windows; draw rectangles, boxes, borders and regions; and update cursors.

For each of these graphics calls, you have a corresponding patch function call. The job of these patch functions is to directly mimic the low-level calls by performing the same operations on the off-screen model database. For instance, the instruction draw text would draw text on the screen as well as merge text into the model.

Figure 3:
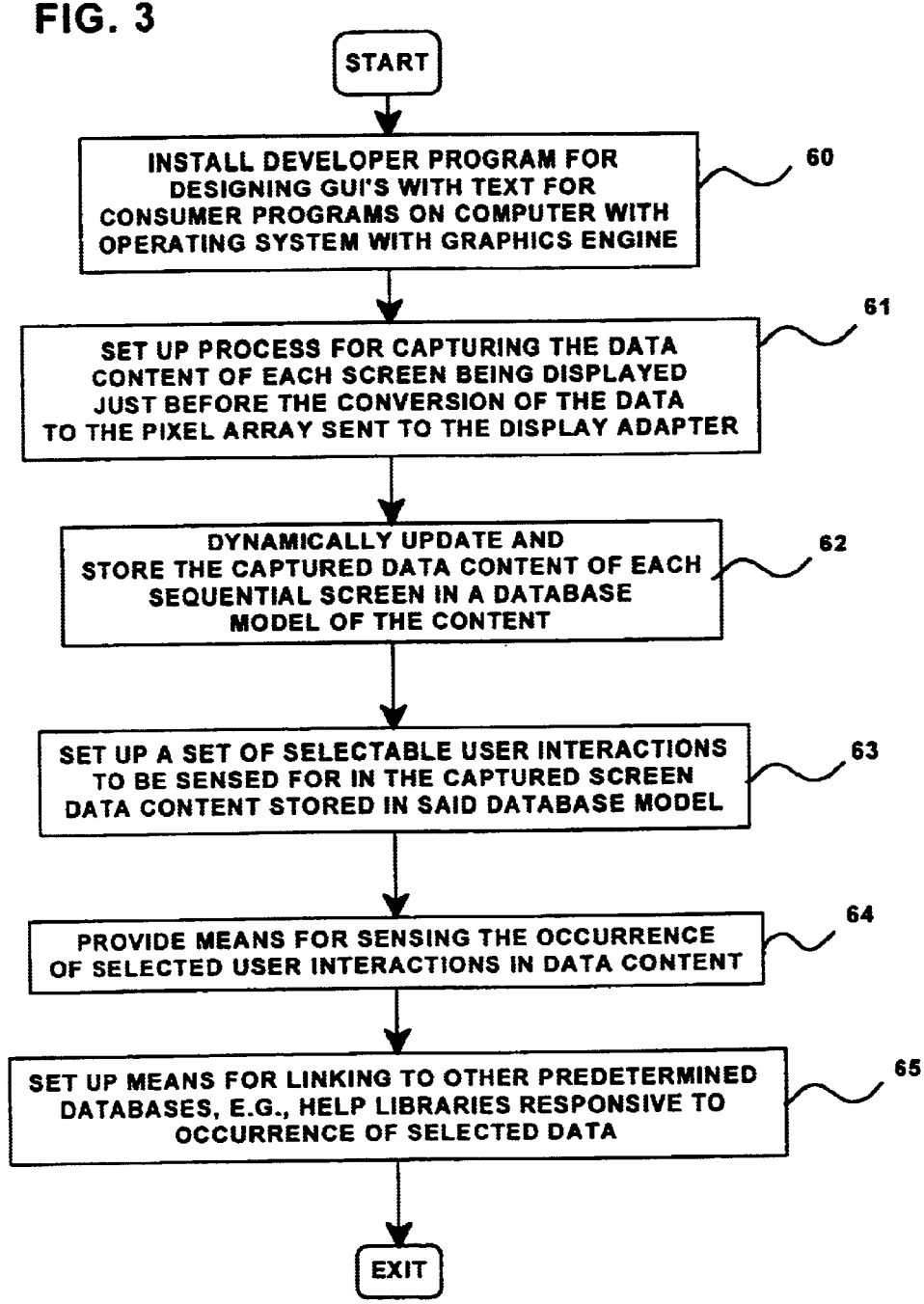
FIG. 3 is a flowchart showing the development of the program of the present invention for using an off-screen database model of the data content of a sequence of screen frames or updates to access information normally inaccessible through the display interface.

Now with reference to FIG. 3, we will describe the setting up of a system according to the present invention for dynamically capturing the dynamic data content of each of a sequence of screen updates and storing this content in an off-screen database model so that in the present example, the interactive user positioning of cursors relative to text strings on which, help or related information is required will trigger links to databases such as help libraries. Assuming that the development effort is directed to the design of Graphical User Interfaces (GUIs) to a given consumer application program, Then, step 60, the development program is set up in conjunction with a computer operating system having an engine for managing graphical displays. Next, step 61, a process is set up for capturing the dynamic or updated data content of each of the sequence of display screens just before the conversion of the data to the pixel array is sent to the display adapter. The captured data content of each screen is stored in the previously described database model, step 62. At this point, a list of the users' interactions relative to the captured data in the database model is set up, step 63. Means for sensing for the listed user interactions, e.g. cursor movements or highlighting is set up, step 64. It should be noted that some form of cursor positioning over or the highlighting of text should trigger some linkage to help facilities. For example, the key sequence to produce the highlighting for text could be the trigger for linkage to the help facility for the text. Then, the appropriate means for linking to help or other libraries and databases are provided, step 65.

There are, of course, other uses of the present invention besides access to help libraries. Document pages received over the Internet could be stored in a database model of such pages and then such pages could be sensed for text data which could launch linkages to information in databases at other locations on the Internet, preferably through an Internet Browser.

Figure 4:
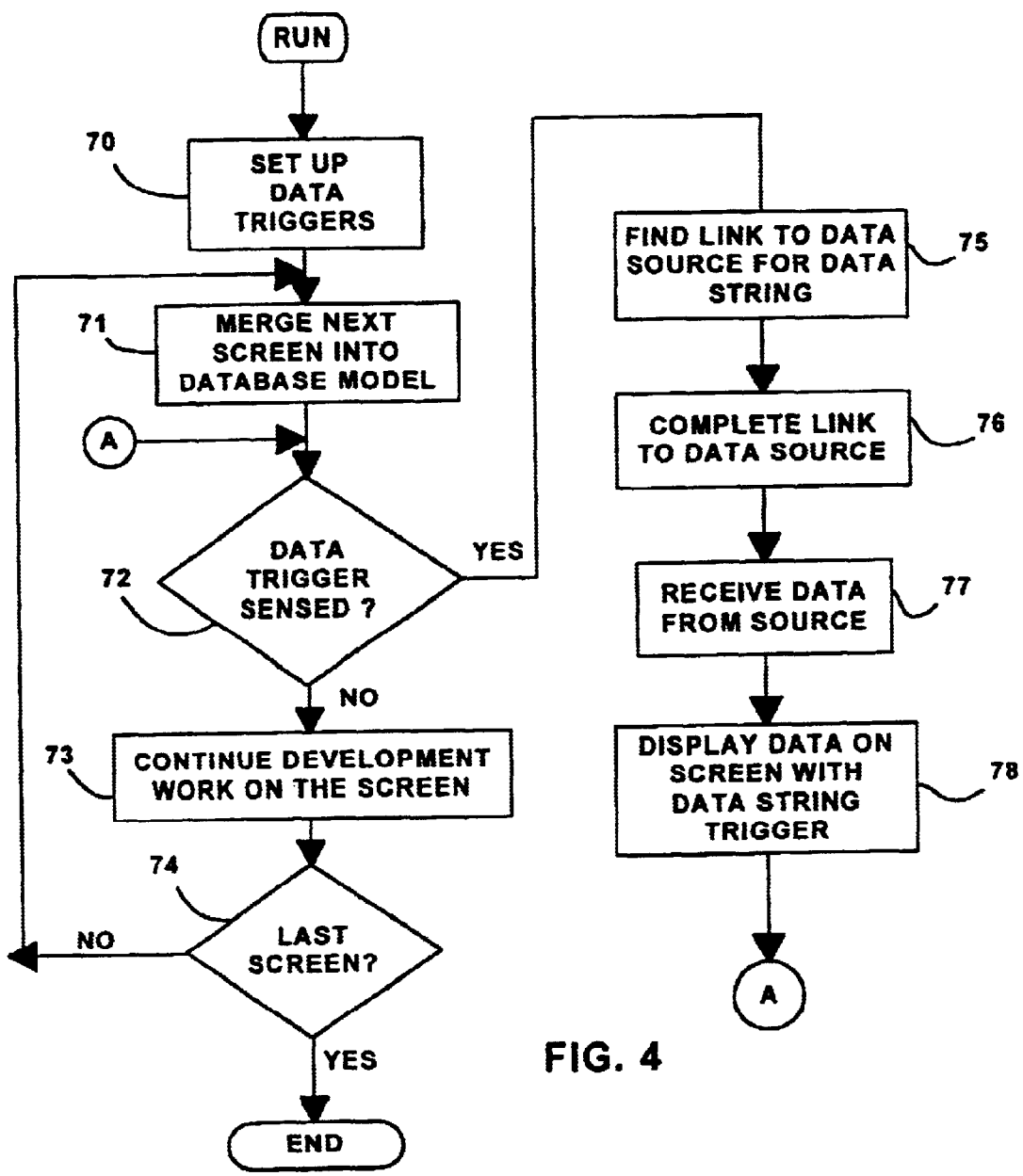
FIG. 4 is a flowchart showing the running of the program described with respect to FIG. 3.

Now that the basic programs have been described and illustrated, there will be described with respect to FIG. 4 a flow of a simple operation showing how the program could be run to sense for particular data input triggers in the stored data context of the database model. For simplicity in illustration in this portion of the description related to the running of the program, we will assume that the data input triggers are related to the getting of textual help from help libraries, which may be available to the user locally or via a network. A table of data input triggers such as cursor positioning or highlighting to be sensed for is set up, step 70. The data content of each next screen or frame is updated and stored in the database model, step 71. Then, in decision step 72, the data triggers in each screen update are sensed for. If no trigger is found, then the designer continues with his GUI development work for the particular screen, step 73, and a determination is made as to whether the last screen has been reached, decision step 74. If Yes, the run is at an end. If No, the process returns to step 71 where the next screen data content is updated and stored in the database model and the above process continued. If in decision step 72 a trigger is sensed, then the system finds the appropriate link to a database, which in the present example could be a library of help functions, step 75, and the link to that data source is completed, step 76. The appropriate data from that source is received, step 77, e.g. on-screen help for a help library which is appropriately displayed, step 78, after which the process returns to step 72 via branch "A" where a determination is made as to whether any other data string trigger has been sensed and the process continues as described above.

In its broadest aspect, the present invention involves the recognition that through the use of an off-screen database model of the dynamic data content of each of a sequence of screen frames, it is possible to interactively access information which is inaccessible through a user interactive display interface. We have given examples of accessing help systems and launching World Wide Web Browsers by means of sensing for triggers in the stored screen content.

Although certain preferred embodiments have been shown and described, it will be understood that many changes and modifications may be made therein without departing from the scope and intent of the appended claims.

What is claimed is:

1. A computer controlled display system with an interactive display interface comprising:
   means for dynamically storing a database model of the data content of said display interface,
   means in said database model for sensing displayed data content in said interface, and
   means responsive to said sensing means for providing additional displayed information to said interface.

2. The computer controlled display system of claim 1, wherein said sensed displayed data content is text.

3. The computer controlled display system of claim 2, wherein said displayed text is responsive to a user input indicating a need for help relative to displayed text.

4. The computer controlled display system of claim 3, wherein said user input designates the displayed text for which help is needed.

5. The computer controlled display system of claim 3, wherein said user input indicating a need for help is an error in said user input.

6. The computer controlled display system of claim 5, wherein said means responsive to said sensing means for providing additional information is a help system.

7. The computer controlled display system of claim 2, wherein said means for providing additional displayed information is a network browser program.

8. The computer controlled display system of claim 7 wherein said browser includes means for establishing links to databases accessed through said network.

9. In a computer controlled display system, a method for providing a display interface comprising:
   dynamically storing a database model of the data content of said display interface, program,
   in said database model, sensing displayed data content in said interface, and
   responsive to said sensed displayed data content, providing additional displayed information to said interface.

10. The method of claim 9, wherein said sensed displayed data content is text.

11. The method of claim 10, wherein said text is displayed responsive to a user input indicating a need for help relative to displayed text.

12. The method of claim 11, wherein said user input designates the displayed text for which help is needed.

13. The method of claim 11, wherein said user input indicating a need for help is an error in said user input.

14. The method of claim 13, wherein said additional information provided responsive to said sensing is a help system.

15. The method of claim 9, wherein said additional displayed information provided responsive to said sensing is accessed through a network browser program.

16. The method of claim 15 wherein said browser program establishes links to databases accessed through said network.

17. A computer controlled display program having program code included on a computer readable medium for providing a display interface comprising:
   means for dynamically storing a database model of the data content of said display interface, means in said database model for sensing displayed data content in said interface, and means responsive to said sensing means for providing additional displayed information to said interface.

18. The display program of claim 17, wherein said sensed displayed data content is text.

19. The display program of claim 18, wherein said displayed text is responsive to a user input indicating a need for help relative to displayed text.

20. The display program of claim 19, wherein said user input designates the displayed text for which help is needed.

21. The display program of claim 19, wherein said user input indicating a need for help is an error in said user input.

22. The display program of claim 21, wherein said means responsive to said sensing means for providing additional information is a help system.

23. The display program of claim 17, wherein said means for providing additional displayed information is a network browser program.

24. The display program of claim 23 wherein said browser includes means for establishing links to databases accessed through said network.

25. In a computer controlled display system having an interactive display interface provided by the combination of an operating system and an application program, a system for accessing information interactively inaccessible through said display interface comprising:

means for dynamically storing a database model of the data content of said display interface, means in said database model for sensing displayed data content in said interface, and means responsive to said sensing means for providing said information to said interface.

26. The computer controlled display system of claim 25, wherein said sensed displayed data content is text.

27. The computer controlled display system of claim 25, wherein said means responsive to said sensing means for providing additional information is a help system.

28. The computer controlled display system of claim 25, wherein said means for providing additional displayed information is a network browser program.

29. The computer controlled display system of claim 28 wherein said browser includes means for establishing links to databases accessed through said network.

30. The computer controlled display system of claim 26, wherein said application program is a text editor program.

31. The computer controlled display system of claim 26, wherein said application program is a program for a personal computer emulating a display interface to a mainframe computer.

32. In a computer controlled display system having an interactive display interface provided by the combination of an operating system and an application program, a method for accessing information interactively inaccessible through said display interface comprising:

dynamically storing a database model of the data content of said display interface, through said database model, sensing for displayed data content in said interface, and providing said information to said interface in response to the sensing of said displayed data content.

33. The method of claim 32, wherein said information provided in response to said sensing is provided through a help system.

34. The method of claim 33, wherein said information provided in response to said sensing is provided through a network browser program.

35. The method of claim 34 wherein said browser includes the step of establishing links to databases accessed through the network.

36. The method of claim 32 wherein said sensed displayed data content is text.

37. The method of claim 36 wherein said application program is a text editor program.

38. The method of claim 32, wherein said application program is a program for a personal computer emulating a display interface to a mainframe computer.

39. A computer controlled display program having program code included on a computer readable medium for accessing information normally inaccessible through an interactive display interface provided by the combination of an operating system and an application program in a computer display comprising:

means for dynamically storing a database model of the data content of said display interface, means in said database model for sensing displayed data content in said interface, and means responsive to said sensing means for providing said information to said interface.

40. The display program of claim 39, wherein said means responsive to said sensing means for providing additional information is a help system.

41. The display program of claim 39, wherein said means for providing additional displayed information is a network browser program.

42. The display program of claim 41 wherein said browser includes means for establishing links to databases accessed through said network.

43. The display program of claim 39, wherein said application program is a text editor program.

44. The display program of claim 39, wherein said application program is a program for a personal computer emulating a display interface to a mainframe computer.

* * * * *